…

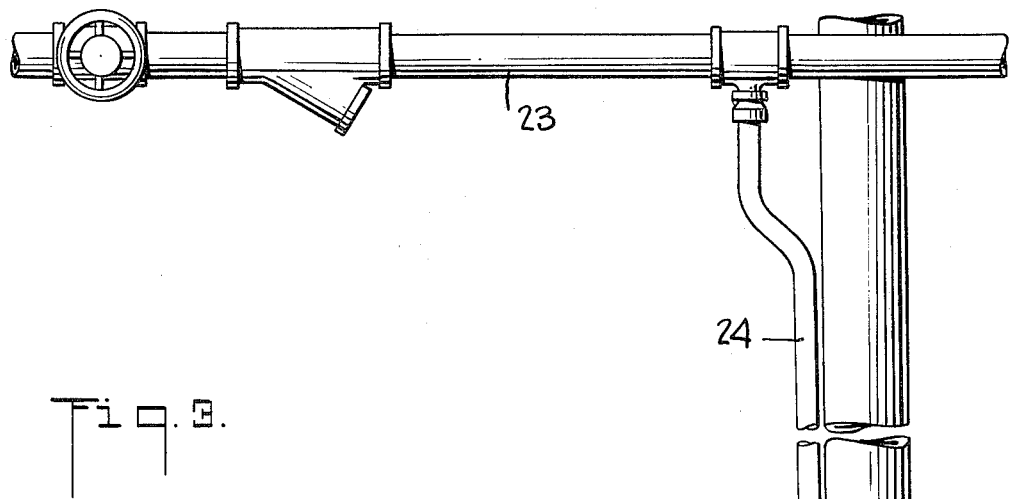
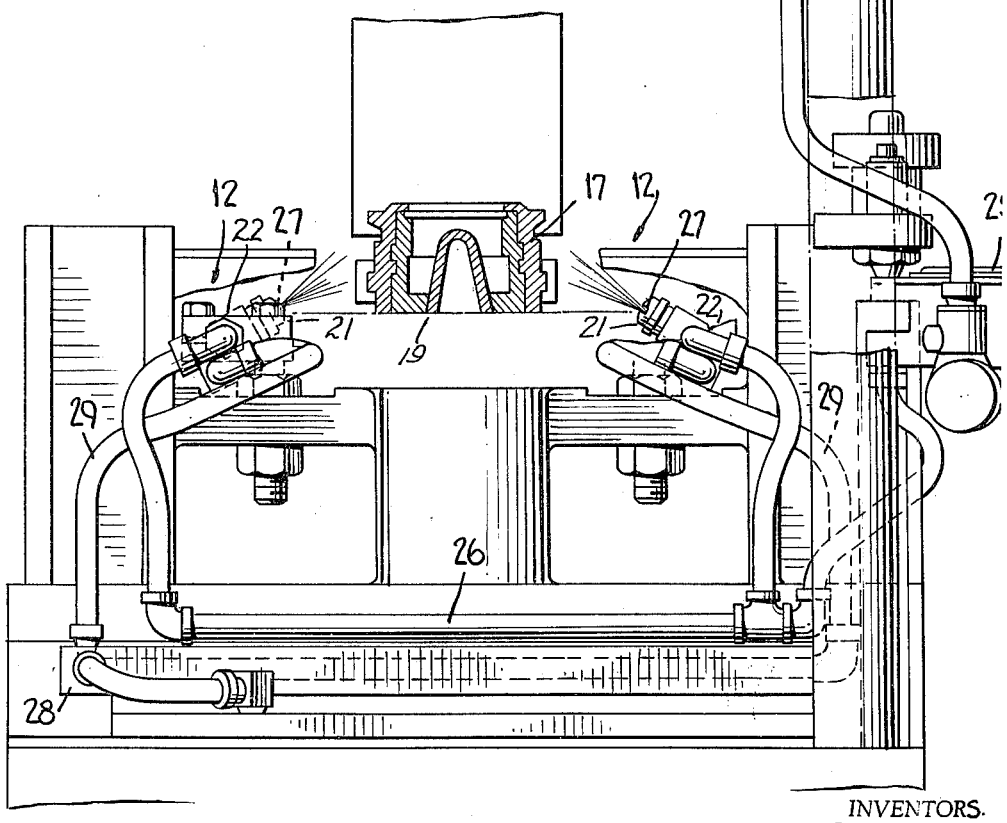
Fig. 3.
INVENTORS.
VERNON L. BLANKENSHI
MARION E. ERTLE

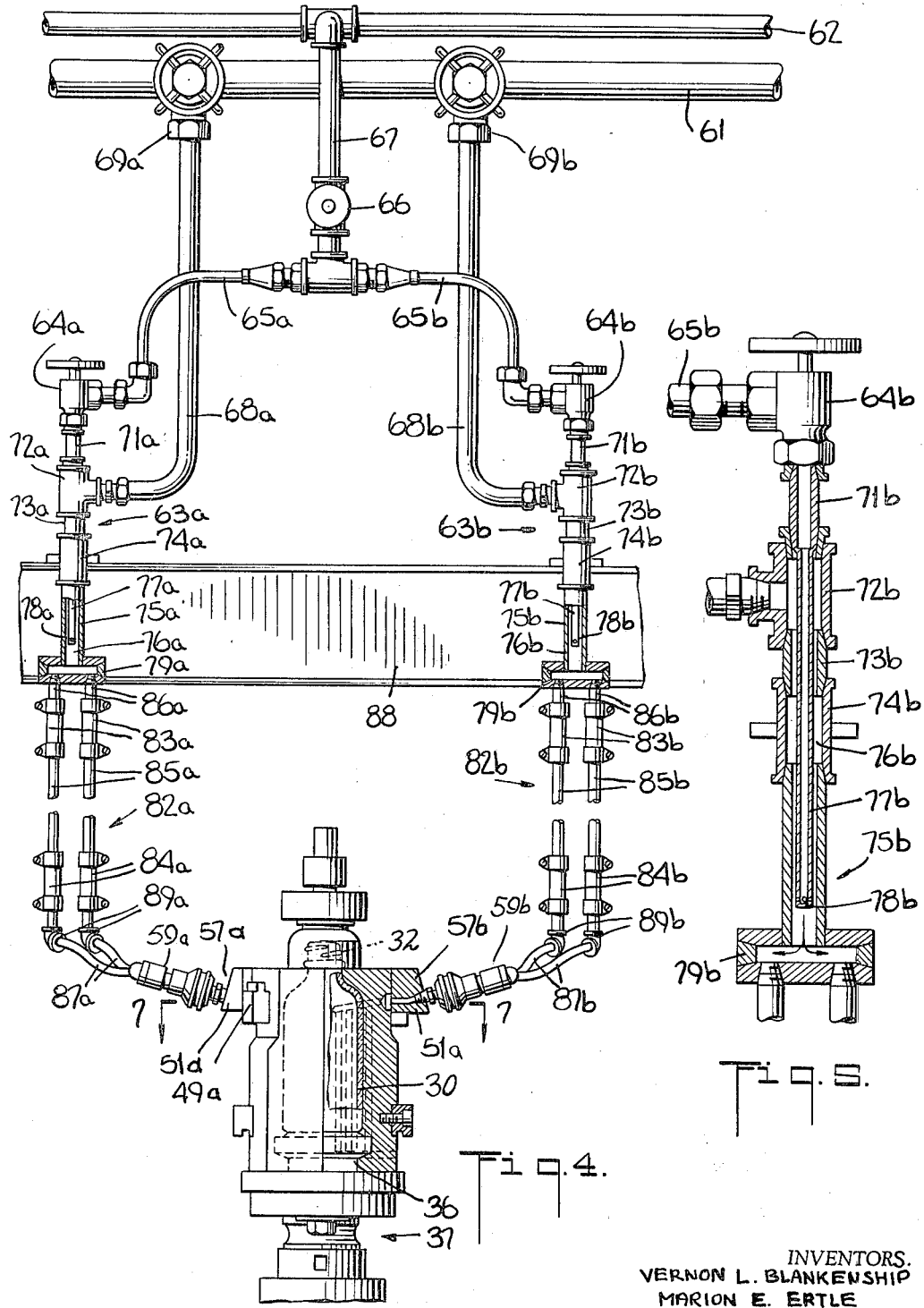

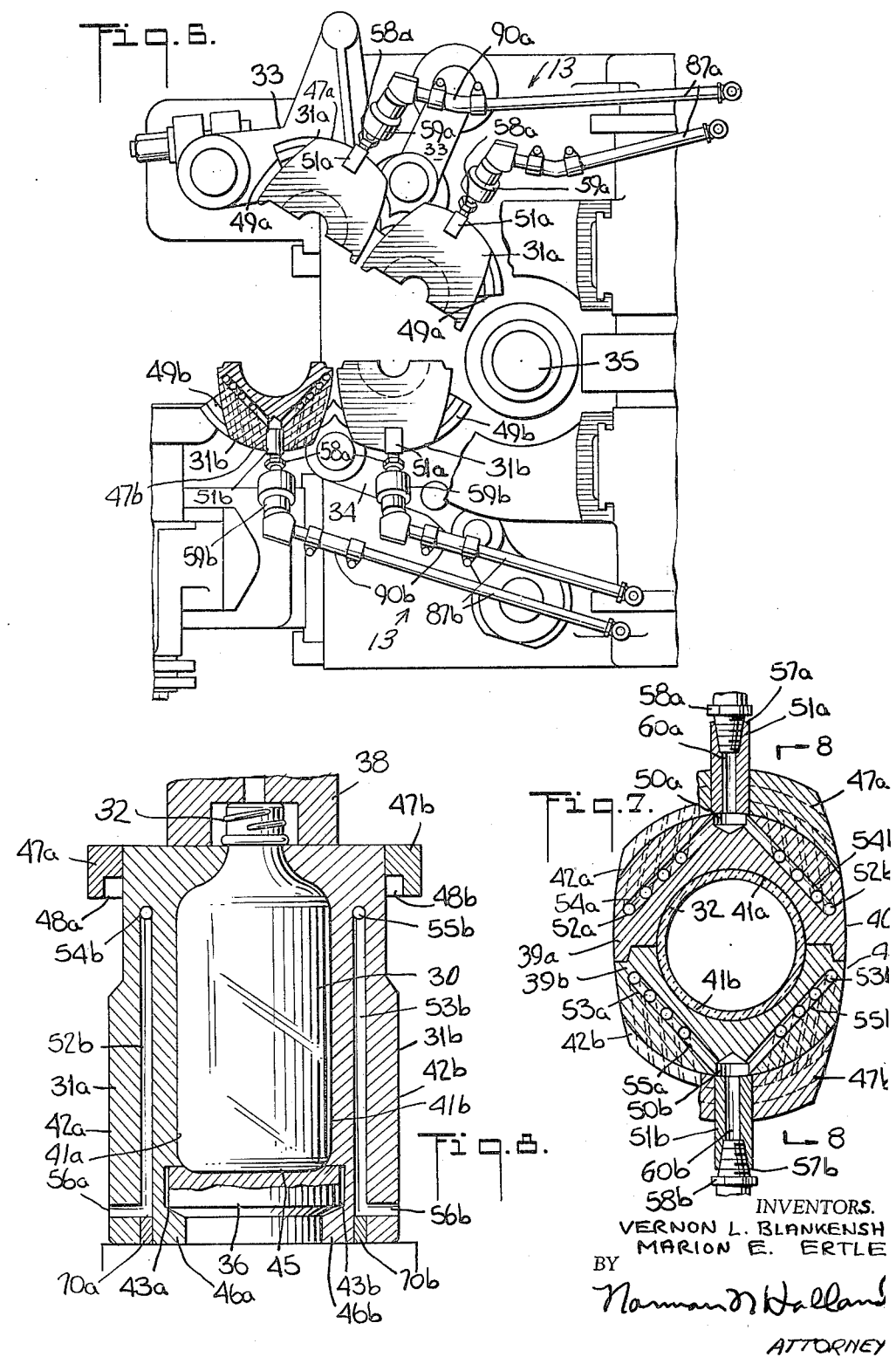

United States Patent Office 3,499,746
Patented Mar. 10, 1970

3,499,746
AIR AND WATER COOLING OF GLASSWARE
FORMING MACHINES
Vernon L. Blankenship and Marion E. Ertle, Winchester, Ind., assignors to Anchor Hocking Corporation, Lancaster, Ohio, a corporation of Delaware
Filed June 1, 1966, Ser. No. 554,509
Int. Cl. C03b 9/38
U.S. Cl. 65—265       1 Claim

ABSTRACT OF THE DISCLOSURE

An improved mold design for glass molding machines such as I.S. machines wherein internal cooling passages and ducts are formed inside the mold to receive an airborne cooling mist. A water mist cooling system for parison neck rings may also be provided.

---

The present invention relates to the manufacture of glassware and to the cooling of the glassware forming machinery. This invention is directed particularly to the cooling of the blow molds of conventional type I.S. machines or machines having a similar type of molds for forming glassware.

In the glassware manufacturing industry there is a continuing endeavor to increase the rate of manufacture of glassware while maintaining or improving the quality of the glassware products. The output capacity of a glass container manufacturing operation is limited by the rate of production of the slowest portion. A limiting factor in the output of I.S. machines has been the low rate of heat dissipation from the neck rings and blow molds. Cooling of the neck rings and blow molds has been accomplished in the past by high velocity air and various designs have been developed to perform this cooling. Mists have recently been directed onto the surfaces of specially designed blow molds to cool the molds. It is, however, very desirable to increase the rate of cooling of the neck rings and blow molds with a minimum of change in the mold and the machine design. The cooling of neck rings may be easily accomplished by projecting a fine spray against the exterior surfaces of conventional neck rings. It is equally desirable to increase the rate of cooling of blow molds without material alteration in the present form of the equipment. Spraying of the outside of the present form of blow molds has not resulted in the necessary degree of cooling. The blow molds require an internal cooling to attain the desired extraction of heat.

Thus, the present invention is directed to an increase in the output capacity of present I.S. machines with a minimum of change to the machine by the internal cooling of blow molds with high velocity air carrying a water mist.

An object of the invention is to increase the capacity of glassware forming machines by increasing the rate of cooling of the glassware without affecting the quality of the glassware.

Another object of this invention is to provide an internal and uniform cooling of blow molds useful for application to conventional glassware forming machines.

Other and further objects of the invention will be obvious upon an understanding of the illustrative embodiment set forth in the following description or described in the appended claim, and various advantages will occur to one skilled in the art upon employment of the invention in practice.

A preferred embodiment of the invention has been chosen for purposes of illustration and description and is shown in the accompanying drawings, forming a part of the specification, wherein:

FIG. 3 is an end view of the parison forming section and the neck ring cooling system;

FIG. 4 is an end view of the blow mold section and the cooling apparatus;

FIG. 5 is a fragmentary sectional view of the mixer of the mist and air;

FIG. 6 is a fragmentary top view of the blow mold section of an I.S. machine with the cooling apparatus;

FIG. 7 is an enlarged sectional view of closed blow molds taken along lines 7—7 of FIG. 4 illustrating the internal passages in the molds;

FIG. 8 is a sectional view of the blow molds taken along lines 8—8 of FIG. 7; and FIG. 9 is a fragmentary sectional view of another embodiment of the internally cooled blow mold.

Figure 1:
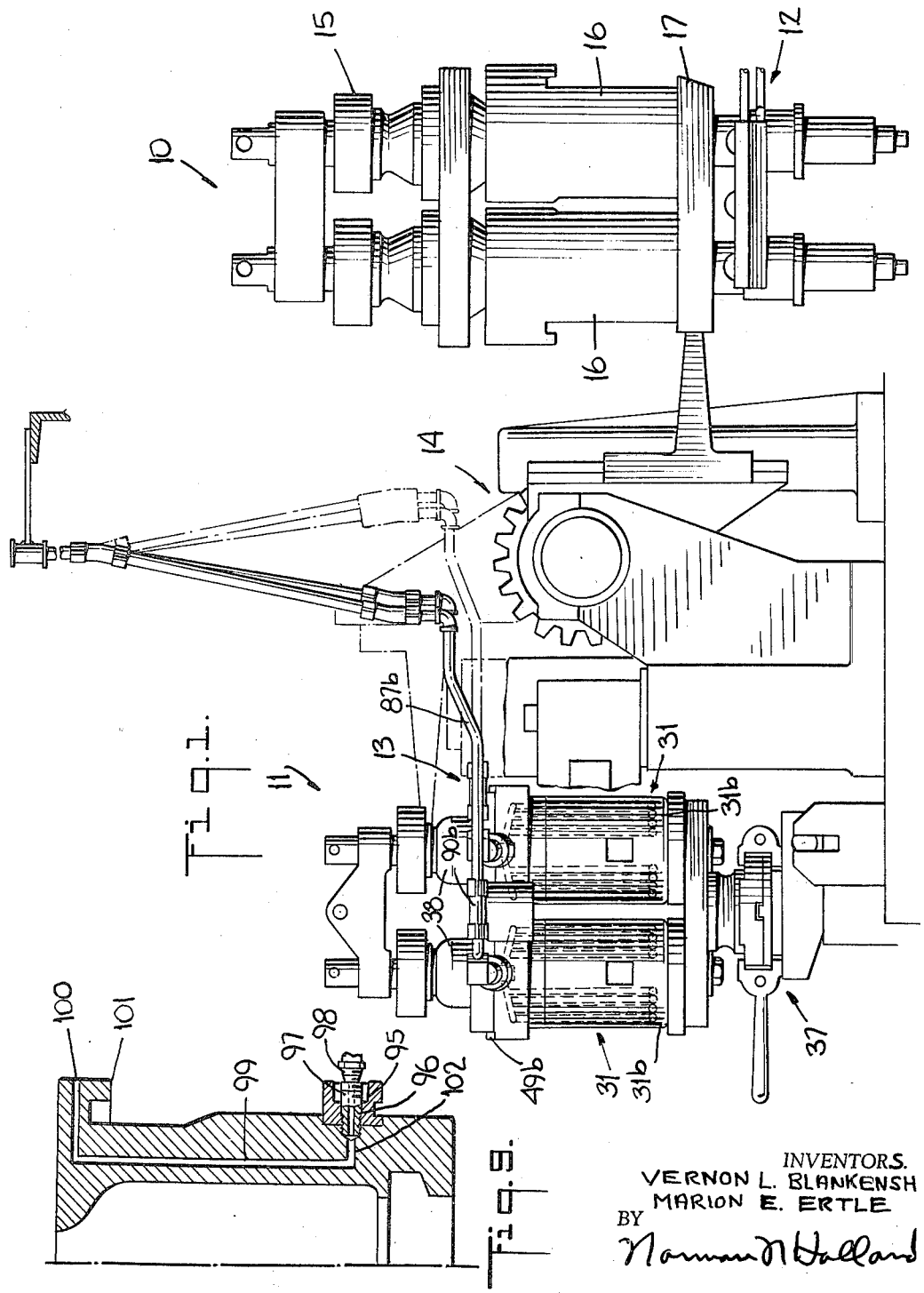
FIG. 1 is a fragmentary side view of the parison forming section and the blow mold section of a glassware forming machine.
Figure 2:
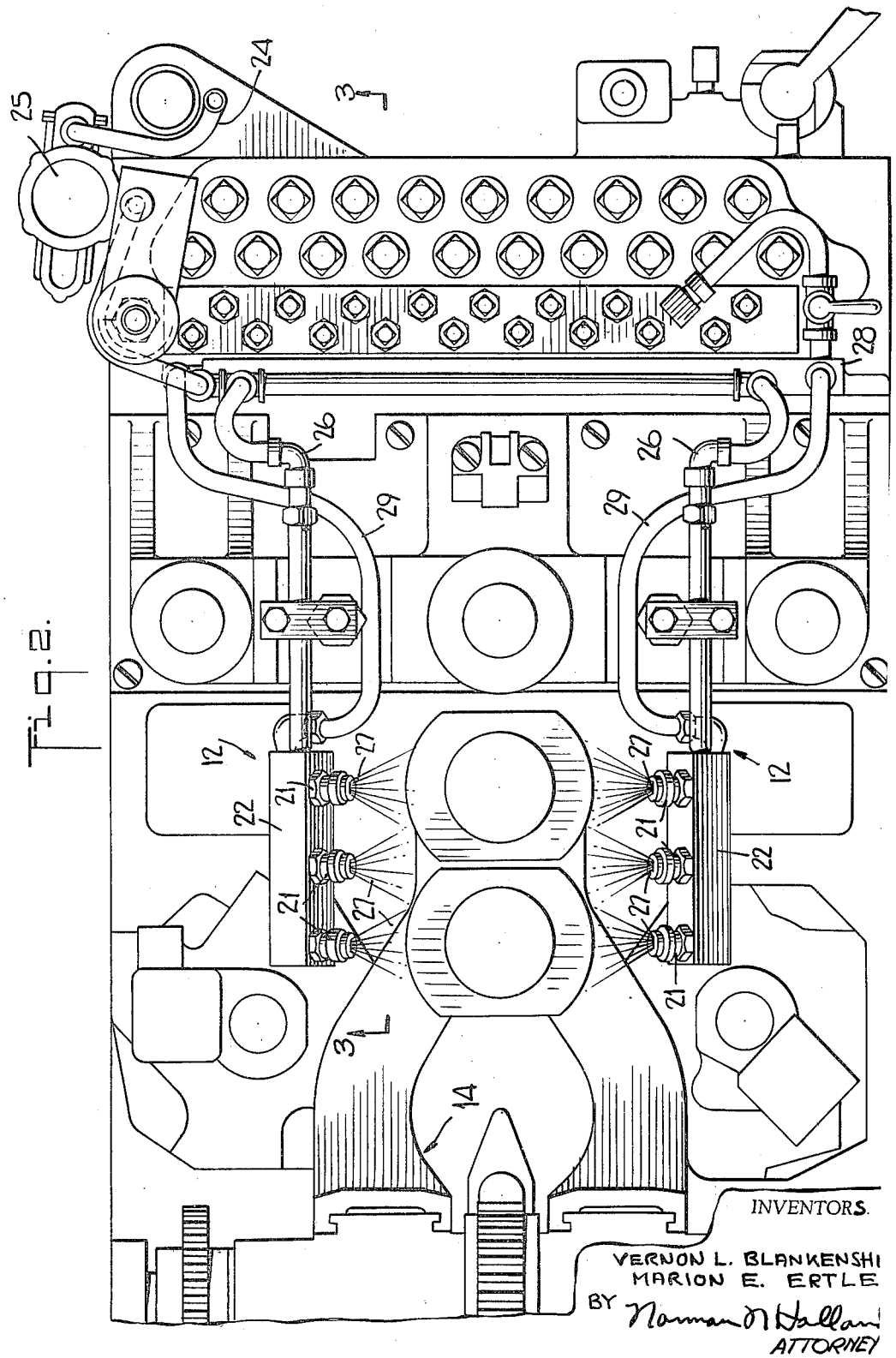
FIG. 2 is a top view of the parison forming section and the neck ring cooling system.

Referring to FIG. 1 of the drawings, a fragmentary view of the parison forming section 10 and blow mold section 11 of a conventional I.S. machine is illustrated in connection with cooling systems 12, 13, respectively. The mechanism 14 for the transference of the parisons from one section to the other is partly illustrated to relate the two sections. At the parison forming section 10 a conventional blowhead 15, parison molds 16 (FIG. 1), neck rings 17 and plunger 19 (FIG. 3) are shown. As best illustrated in FIGS. 2 and 3 the spray cooling system 12 is positioned on each side of and below the neck rings 17 for spraying a generally fine mist on the neck rings to maintain the neck rings in the desired operating temperature range.

Nozzles 21 are mounted on manifolds 22 and are tilted to project the sprays upwardly against the external surfaces of the neck rings 17 to cool the neck rings and rapidly chill the necks 32 of the containers 30. The water for the spray is provided from a water main 23 (FIG. 3) through a pipe 24 to a float valve 25 and then through piping 26 to the manifolds and nozzles. The float valve 25 and the discharge orifices 27 of the nozzles are at the same level to maintain the water just at the discharge orifices without the water dripping from the nozzles. Compressed air is supplied from the supply header 28 and piping 29 (FIG. 2) in timed relation to the opening and closing of the molds. The compressed air is only applied to the nozzles when the molds are closed so that the atomized water does not impinge on the inside of the molds.

Referring to FIGS. 1 and 6 of the drawings, the blow mold section 11 of the machine is shown with the blow mold cooling system 13. Two blow molds 31 are provided, each formed in two halves respectively. The blow mold halves 31a, 31b (FIG. 6) are attached to the conventional linkages 33, 34 (FIG. 6), respectively, for pivoting the halves about the pin or shaft 35 to open and close the mold halves. The molds are opened to receive parisons, closed for shaping of the glass container 30 and opened for discharge of the formed container. The containers' bottoms are formed and supported by conventional plates 36 (FIGURES 4 and 8) enclosed between the lower ends of the mold halves. The bottom plates 36 as mounted on conventional supports 37 (FIGS. 1 and 4). Above the molds are conventional blow heads 38 fitting over the chilled necks for supplying air to the neck of the parison to form the glass container.

The blow mold halves 31a, b comprise generally crescent shaped walls 39a, b (FIG. 7) having in this embodiment generally cylindrically shaped inner surfaces 41a, b forming the side shaping walls of the molds. The outer surfaces 42a, 42b are cylindrical and terminate at the generally flat side walls 40a, b to impart a generally oval shape to the closed molds. The lower ends of the halves have inner grooves 43a, 43b (FIG. 8) shaped to conform to and receive the bottom plates 36. The side surfaces 41a, b are curved inwardly to meld with the upper surfaces of the recesses 45 in the bottom plates which form the lower edge and bottom of the containers. As illustrated, the halves 31a, b extend above the bottom plates 36 and widen to form rims 46a, b fitting under the bottom plates 36 in a clamping relation. The walls of the halves thicken in an axial downward direction by extending the surfaces 42a, 42b outwardly.

At the upper end of the mold halves 31a, b, horizontally extending flanges 47a, b (FIGS. 6–8) are provided. The flanges extend horizontally beyond outer walls of the mold halves and have curved grooves 48a, b on the under surface thereof for receiving the curved tongues 49a, b (FIG. 6) pivotally attached to the linkages 33, 34 opening and closing the mold halves. The flanges 47a, 47b are vertically notched through the grooves for receiving generally rectangular-shaped blocks 51a, b having outer sloped surfaces 57a, b (FIG. 4).

The particular feature of the blow mold section 11 and the blow molds 31 is the cooling of the molds 31 by an air-borne mist for a more rapid extraction of heat from the mold halves. As best illustrated in FIGS. 7 and 8, the mold halves 31a, 31b have two sets of vertical passages 52a, b, 53a, b, extending substantially the entire length of the mold halves. Each set is aligned in parallel in a plane normal to the radius of the chamber wall. The two planes are approximately at right angles to one another. The passages are connected at the upper ends by straight ducts 54a, b, 55a, b, connected to recesses 50a, b, in the mold half at the notches in the flange. As illustrated in FIG. 2, the ducts are at a slight angle downward to the horizontal. At the lower end separate exhaust outlets 56a, b are connected to the extreme ends of the passages and extend horizontally to the outer surfaces 42a, b. As illustrated, the outlets are generally parallel to one another to project the exhausted cooling medium from the outlets into the unobstructed space on the sides of the molds.

The passages, ducts and outlets are drilled in the molds. The passages 52a, b, 53a, b, are drilled from the bottom of the mold and closed by plugs 70a, b. The ducts 54a, b, 55a, b, are drilled from the recesses 50a, b, at the notches in the flanges. The outlets are drilled from the outer walls 42a, b, into the passages 52a, b, 53a, b. Thus the present type of mold is easily provided with internal passage means for the air-borne cooling mist.

The molds 31 are provided with a cooling medium of air-borne mist from the apparatus illustrated in FIGS. 1, 4, 5, 6 and 7. The blocks 51a, b, in the notches in the flanges 47a, 47b, have channels 60a, b (FIG. 7) extending from the outer sloped surfaces 57a, b, to the inner surface engaging the mold and threaded openings for receiving the fittings 58a, b, fastening the connectors 59a, b, for a quick attachment and detachment of the mold from the cooling medium supply apparatus.

The cooling medium supply apparatus is best illustrated in FIGS. 4, 5 and 6. In FIG. 4 the pipe 61 provides compressed air and the main 62 provides water. The mixers 63a, b, have valves 64a, b, at the upper end connected to the water supply main through pipes 65a, b, valve 66, and pipe 67. The air supply pipe is separately connected to the mixers by pipes 68a, b, and valves 69a, b, respectively. The mixers 63a, b, in addition to valves 64a, b, comprise tubular members 71a, b, fittings 72a, b, tubular members 73a, b, connectors 74a, b, and the T-shaped fittings 75a, b, to form elongated chambers 76a, b. The pipes 68a, b, are connected to the side threaded portions of the fittings 72a, b, to supply air to the chambers 76a, b. Long tubular rods 77a, b, extend coaxially in the chambers 76a, b, and terminate in tubular portions of the fittings 75a, b, and have radially extending holes 78a, b, to project sprays of water into the chambers 76a, b. The water forms into a fine mist suspended in the flowing air.

The cooling system 13 is positioned above the blow mold section 11 and extends downwardly from the air and water mains. The mixers 63a, b, extend vertically with the air and water flowing downwardly and are coupled to the connectors 59a, b, by the piping 82a, b, which provides a flexible interconnection between the mixers 63a, b, rigidly mounted on the beam 88 and the opening and closing mold halves 31a, b. The flexible sections 83a, b, 84a, b, and the pipe sections 85a, b, extend vertical. The flexible sections 83a, b, are connected to the pipe stubs 86a, b, on the T-shaped fittings 75a, b, and the flexible sections 84a, b, are connected to the pipe sections 85a, b, for forming a vertical hingelike means for a horizontal movement of the piping system, as illustrated in FIG. 1, on opening and closing of the molds 31a, b. The horizontally extending pipe sections 87a, b, are connected between the elbows 89a, b, and the flexible sections 90a, b, to impart a resilient action between the pipe sections 87a, b, and the connectors 59a, b, on movement of the molds.

The flow of water from the holes is controlled by the valves 64a, b, on the mixers. The water issues from the holes as jets which are disintegrated by impingement on the wall of the T-shaped fitting and the high velocity flow of air through the chamber to form droplets. Those droplets become entrained in the flowing air and are further disintegrated by turbulence and evaporation into the air stream. The air and suspended mist are carried by the piping 82a, b, to the molds. The air cooled by the evaporation of droplets and the water liquid and vapor impinge on the walls of the passages 52a, b, 53a, b, to extract heat from the molds 31a, b, and maintain the desired operating range. The discharge from the outlets 56a, b, comprises hot air and steam. Any liquid droplets remaining will be suspended in the discharge. The mist in the air stream is controlled by the valves 64a, b, so that there is no leakage or dripping of water from the outlets at the bottom of the mold halves.

In another embodiment of the invention illustrated in FIG. 9 the mold mounting brackets 95 are modified to provide inlets for the cooling medium. The bolts 96 securing the mold mounting brackets to the molds have bores 97 with fittings 98 to receive the connectors. The passages 99 are similarly arranged to the passages 52a, b, 53a, b, of the previous embodiment. Inlet ducts 102 connect the passages 99 to the bore 97. The upper ends of the passages have generally horizontal outlets 100 extending through the flanges 101. The air-borne mist flows upwardly instead of downwardly.

It is thus seen from the foregoing description that the glass molding portions of glassware forming machines may be readily cooled by air and water mist. Particularly significant is the adaptation of the present form of blow molds to internal cooling for an increase in the rate of extraction of heat. The present blow molds may be easily altered to add the cooling system with only minor changes to the glassware forming machine. Also, the neck rings in the parison forming section may be readily cooled by an external mist applied to the exterior surface of the neck rings. Thus at these two glass forming portions of the I.S. machines the rate of cooling is greatly increased while maintaining the proper extraction of heat from the glassware to maintain a high quality production. The present I.S. machines may be readily modified to increase the productivity at a modest expense.

As various changes may be made in the form, construction and arrangement of the parts herein without departing from the spirit and scope of the invention and without sacrificing any of its advantages it is to be understood that all matter herein is to be interpreted as illustrative and not in a limiting sense.

Having thus described our invention, we claim:

1. In a glass forming machine an improved mold cooling means comprising the combination of a mold having a glass forming cavity therein, a cooling system for supplying high velocity air with mist suspended therein to said mold, said mold having a plurality of closely spaced and straight and generally parallel internal drilled passages of circular cross section positioned beneath the outer surface of the mold and surrounding said cavity thereby presenting a plurality of elongated rounded heat exchanging surfaces to said cavity, straight drilled inlet ducts of circular cross section intersecting the upper ends of the passages and communicating with the outer surface of said mold, straight drilled outlet ducts of annular cross section intersecting the lower ends of the passages, and valve means for applying the cooling air-borne mist to said inlet ducts at a controlled rate whereby no liquid drains from said outlet ducts.

References Cited

UNITED STATES PATENTS

| | | | |
|---|---|---|---|
| 964,198 | 7/1910 | Barrez | 65—355 X |
| 1,865,967 | 7/1932 | Schoonenberg | 65—267 X |
| 2,485,836 | 10/1949 | MacConnell | 65—356 |
| 1,622,513 | 3/1927 | Holmes | 137—205 |

ARTHUR D. KELLOGG, Primary Examiner

U.S. Cl. X.R.

65—267, 355, 356